United States Patent [19]

Barrow et al.

[11] Patent Number: 4,751,427

[45] Date of Patent: Jun. 14, 1988

[54] THIN-FILM ELECTROLUMINESCENT DEVICE

[75] Inventors: William A. Barrow, Beaverton; Christopher N. King; Richard E. Coovert, both of Portland; Ronald O. Petersen, Banks, all of Oreg.

[73] Assignee: Planar Systems, Inc., Beaverton, Oreg.

[21] Appl. No.: 887,361

[22] Filed: Jul. 16, 1986

Related U.S. Application Data

[63] Continuation of Ser. No. 588,894, Mar. 12, 1984, abandoned.

[51] Int. Cl.$^4$ ............................ H01J 1/62; H01J 63/04
[52] U.S. Cl. ..................................... 313/503; 313/509
[58] Field of Search ............... 313/498, 502, 503, 506, 313/509; 252/301.4 S, 301.6 S, 521, 301.4 H; 427/66

[56] References Cited

U.S. PATENT DOCUMENTS

| | | | |
|---|---|---|---|
| 4,129,519 | 12/1978 | Matsuzawa | 252/301.4 S |
| 4,181,753 | 1/1980 | Fischer | 252/301.6 S |
| 4,194,141 | 3/1980 | Langer et al. | 252/301.4 H |
| 4,211,813 | 7/1980 | Gravisse et al. | 252/301.4 S |
| 4,263,339 | 4/1981 | Fischer | 252/301.6 S |
| 4,365,184 | 12/1982 | Hifton et al. | 313/503 |
| 4,374,037 | 2/1983 | Takahashi | 252/301.4 S |
| 4,442,377 | 4/1984 | Hifton et al. | 313/506 |
| 4,482,841 | 11/1984 | Tiku et al. | 313/506 |

FOREIGN PATENT DOCUMENTS 57-102983 6/1982 Japan .

OTHER PUBLICATIONS

"DCEL Dot Matrix in Range of Colors", by A. Vecht, 1980, pp. 110-111, Society of Information Display Symposium.
"Alkaline Earth Sulfide Phosphors Activated by Copper, Silver, and Gold", by W. Lehman, 1970, J. Electro Chem Soc. pp. 1389-1392.
"Optimum Efficiency of Cathodoluminescence of Inorganic Phosphors", by W. Lehman, 1971, pp. 1164-1166, J. Electrochem Soc.

Primary Examiner—S. Leon Bashore
Assistant Examiner—Michael K. Boyer
Attorney, Agent, or Firm—Chernoff, Vilhauer, McClung & Stenzel

[57] ABSTRACT

A highly efficient, AC-excited, blue light-emitting phosphor for solid-state thin-film electro-luminescent (TFEL) devices is comprised of strontium sulphide (SrS) host material doped with cerium fluoride ($CeF_3$) acting as an emitter providing a source of photons. The blue $SrS:CeF_3$ phosphor is about one hundred times brighter than the brightest zinc sulphide/thulium fluoride ($ZnS:TmF_3$) blue phosphor heretofore known. To increase brightness level, at some loss of energy efficiency, electron-injection layers of zinc sulfide (ZnS) are placed on either side of the $SrS:CeF_3$ layer in the TFEL device.

7 Claims, 5 Drawing Sheets

THIN-FILM ELECTROLUMINESCENT DEVICE

GENERAL

The research culminating in this invention was conducted, in part, under contract DAAK20-82-C-0384 with the U.S. Army Electronics Research and Development Command, Fort Monmouth, N.J., pursuant to which contract the Government possesses certain property rights in said invention.

This is a continuation of co-pending application Ser. No. 588,894, filed on Mar. 12, 1984, now abandoned.

BACKGROUND OF THE INVENTION

This invention relates to a blue phosphor for use in thin-film electroluminescent (TFEL) devices such as electronically-controlled matrix display panels, the blue phosphor comprising a strontium sulphide (SrS) host material doped with cerium fluoride ($CeF_3$) in a concentration sufficient to provide a significant source of visible light photons.

There has been a need for the development of an efficient blue light phosphor for use in TFEL devices. While efficient phosphors for the other primary colors have been developed for solid-state TFEL devices, the brightest TFEL blue phosphor heretofore known is a zinc sulphide host material doped with thulium fluoride ($ZnS:TmF_3$) which has a brightness of 0.33 foot lamberts (fL) at 1 kHz drive excitation. In addition to the fact that the eye is relatively insensitive to the blue part of the visible light spectrum, an additional factor which has rendered efficient solid-state blue emitters so difficult to develop is the large energy transfer required for their excitation because so much of the energy is dissipated in other competing lower energy channels such as optical phonons, donor-acceptor pairs, or lower energy atomic transitions before the blue center is excited. Without an efficient blue phosphor, full-color TFEL display panels, usable in room-light environments, have not been practical.

The use of SrS and other alkaline earth sulphides such as CaS and BaS as host materials for luminescent phosphors, such as those used in powder electroluminescent devices, is disclosed by A. Vecht et al. in "DCEL Dot Matrix Displays in a Range of Colors," Digest of the 1980 Society for Information Display International Symposium, pp. 110–111, and also in Highton and Vecht's U.S. Pat. No. 4,365,184. In addition, the following references describe CRT blue or other primary color powder phosphors using strontium sulphide or other alkaline earth sulphide phosphors:

W. Lehman, "Alkaline Earth Sulfide Phosphors Activated by Copper, Silver, and Gold," J. Electrochem Soc. 117, p. 1389 (1970);

W. Lehman, "On the Optimum Efficiency of Cathodoluminescence of Inorganic Phosphors," J. Electrochem Soc. 118, p. 1164 (1974);

W. Lehman and F. M. Ryan, "Cathodoluminescence of CaS:Ce and CaS:Eu Phosphors," J. Electrochem Soc. 118, p. 477 (1971).

The work by these prior investigators established that SrS, together with CaS, are efficient phosphor hosts in powder form for use in DC-excited and cathodoluminescent applications, but, because of the inherent differences with solid-state TFEL devices, as regards their respective excitation mechanism and structure, no direct correlation could be made or inferred that SrS would likewise be an efficient host material for an AC-excited blue phosphor TFEL device.

SUMMARY OF THE INVENTION

This invention relates to the use of SrS as a host for a blue phosphor TFEL device. More specifically, the invention is directed to a highly efficient AC-excited TFEL blue phosphor comprised of SrS doped with cerium fluoride ($CeF_3$). TFEL devices of the $SrS:CeF_3$ composition described were prepared by co-evaporation of the host and emitter materials onto a substrate, care being taken to minimize the level of impurities in the deposited films. After deposition the laminar device containing the deposited host-emitter layer and, in some embodiments, sandwiching ZnS electron-injection layers, are heat treated at 600° C. or above to crystalize the structure.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
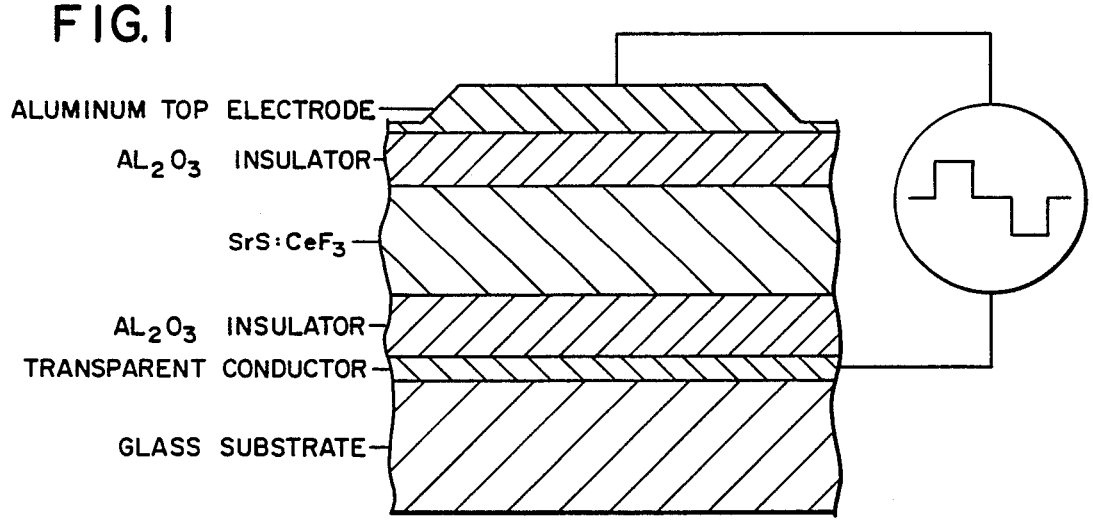
FIG. 1 is a schematic representation of a three-layer TFEL device made according to the principles of the present invention.

In its standard form a conventional state-of-the-art TFEL device structure, such as that depicted in Inazaki et al. U.S. Pat. No. 3,946,371, comprises five layers, namely, a pair of insulating layers sandwiching an electroluminescent phosphor layer, and a pair of electrodes sandwiching the insulating layers. The entire laminar structure is being supported on a substrate of glass or other transparent material, with the TFEL panel being driven by a source of alternating electrical polarity. In FIG. 1 such a structure is shown with the phosphor element being the $SrS:CeF_3$ blue phosphor of the present invention.

Figure 2:
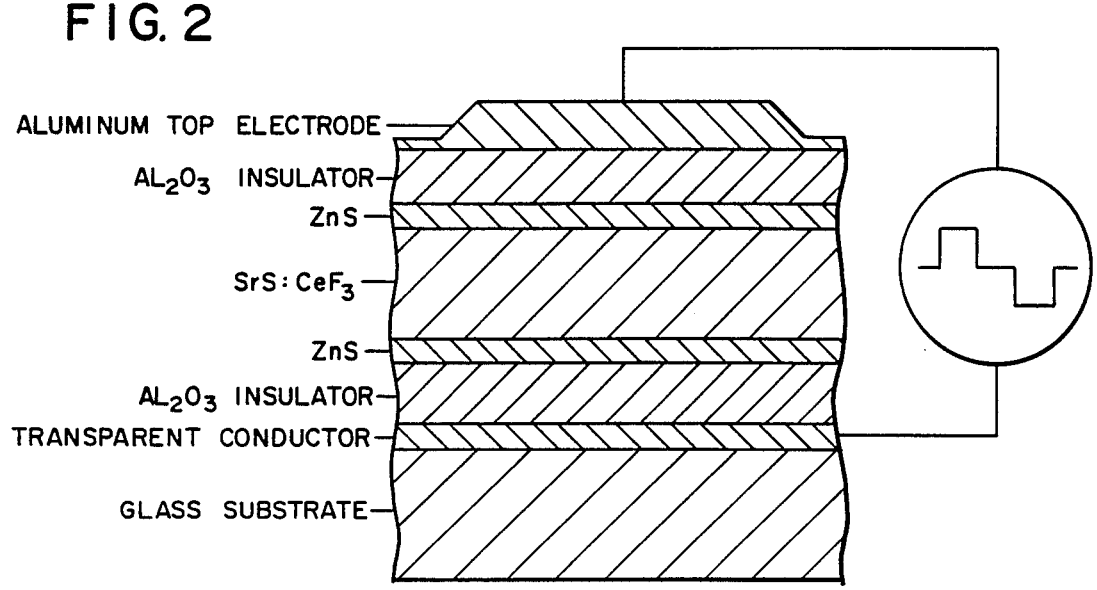
FIG. 2 is a schematic representation of a modified embodiment of the TFEL device depicted in FIG. 1 which includes an additional pair of electron-injection layers sandwiching the host-emitter layer.

An improvement to the aforedescribed five-layer structure is accomplished by providing a pair of thin-film ZnS layers intermediate the phosphor layer and the sandwiching insulation layers. These additional intermediate layers serve as carrier injection layers to augment the supply of available carriers, modify the threshold voltage, and change the energy distribution of the charge carriers, thereby increasing the amount of visible light emitted from the phosphor layer. This modified TFEL structure, with the SrS:CeF$_3$ blue phosphor of the present invention included, is illustrated in FIG. 2.

Experimental investigation has demonstrated that, in a TFEL device of the type described, utilizing SrS as the host matter and a CeF$_3$ dopant as an emitter produces a blue phosphor which is significantly brighter and more efficient than any previously known to the art.

EXAMPLE 1

A SrS:CeF$_3$ layer for a TFEL device of the configuration illustrated in FIG. 1 was produced onto a 2-inch by 2-inch substrate having a indium tin oxide transparent electrode layer thereon. Next, an aluminum oxide (Al$_2$O$_3$) insulating layer of 2500 Å thickness was deposited onto a one-inch-square area. The SrS host material was deposited in vacuo by electron beam evaporation and the CeF$_3$ dopant was co-deposited by evaporation from a resistance-heated thermal source. The host was deposited at a rate of 6 Å/sec until a film thickness of 5000 Å was achieved. The dopant was co-deposited with the host material at an evaporation rate 0.23% (about 1/400) of the evaporation rate of the latter. The thickness of the host film layer was measured during deposition by both an optical interference monitor and a crystal rate monitor. After the deposition of the phosphor layer was completed, a second insulation layer of aluminum oxide (Al$_2$O$_3$) having a thickness of 2500 Å was formed to sandwich the phosphor layer. Finally, an aluminum electrode layer of 1000 Å thickness was deposited to complete the TFEL structure.

EXAMPLE 2

A TFEL device of the configuration illustrated in FIG. 2 was produced by adding, to the SrS:CeF$_3$ phosphor layer formed in accordance with the process described in reference to Example 1, a pair of sandwiching thin-film carrier injection layers of ZnS material. These layers, which are intermediate the phosphor layer and the respective Al$_2$O$_3$ insulation layers, Were formed to 1000 Å thickness by thermal deposition at a rate of 10 Å/second.

During the depositions of the thin-film layers the substrate was held at 250° C., after deposition was completed, the resultant TFEL structure was annealed in vacuo to promote a high degree of crystallization by bringing the temperature of the structure to above 600° C. and holding it at such elevated temperature for a period of one hour. (Heat treatment was found to be critical to the performance as specimens which were annealed at temperatures less than 600° C. exhibited but minimal light emission.) On the other hand, above 600° C., TFEL devices of the type described which were annealed at higher temperatures exhibited significantly greater brightness levels.

Because of the hydrophilic nature of the SrS material and its tendency to convert from the sulphide to sulphate and oxide, repeated firings of the sulphate in H$_2$S and careful handling was required once the material was produced. In addition, the SrS source material, as well as the deposited film, were checked for the presence of impurities, such as as SrSO$_4$ and SrO, by means of X-ray diffraction.

Of the runs of SrS:CeF$_3$ blue phosphor specimens prepared in accordance with the procedure of these two examples, the most efficient one, which was of the configuration depicted in FIG. 1, exhibited, at a 1 kHz drive frequency, a luminance of 24 fL and an efficiency of 0.39 lumens/watt.

On the other hand, the inclusion of the intermediate ZnS carrier injection layers measurably improved brightness performance. Of the specimens having the configuration depicted in FIG. 2, the best exhibited a luminance of 45 fL (i.e., two times brighter) and an efficiency of 0.13 (one-third as efficient).

The efficiency of the phosphor was found to decrease as the stoichiometry of the SrS was altered. Also, the relative concentration of dopant to host material in the phosphor affected blue light emissivity, and, for effective performance, the relative concentration level should be less than about 2%.

Figure 3:
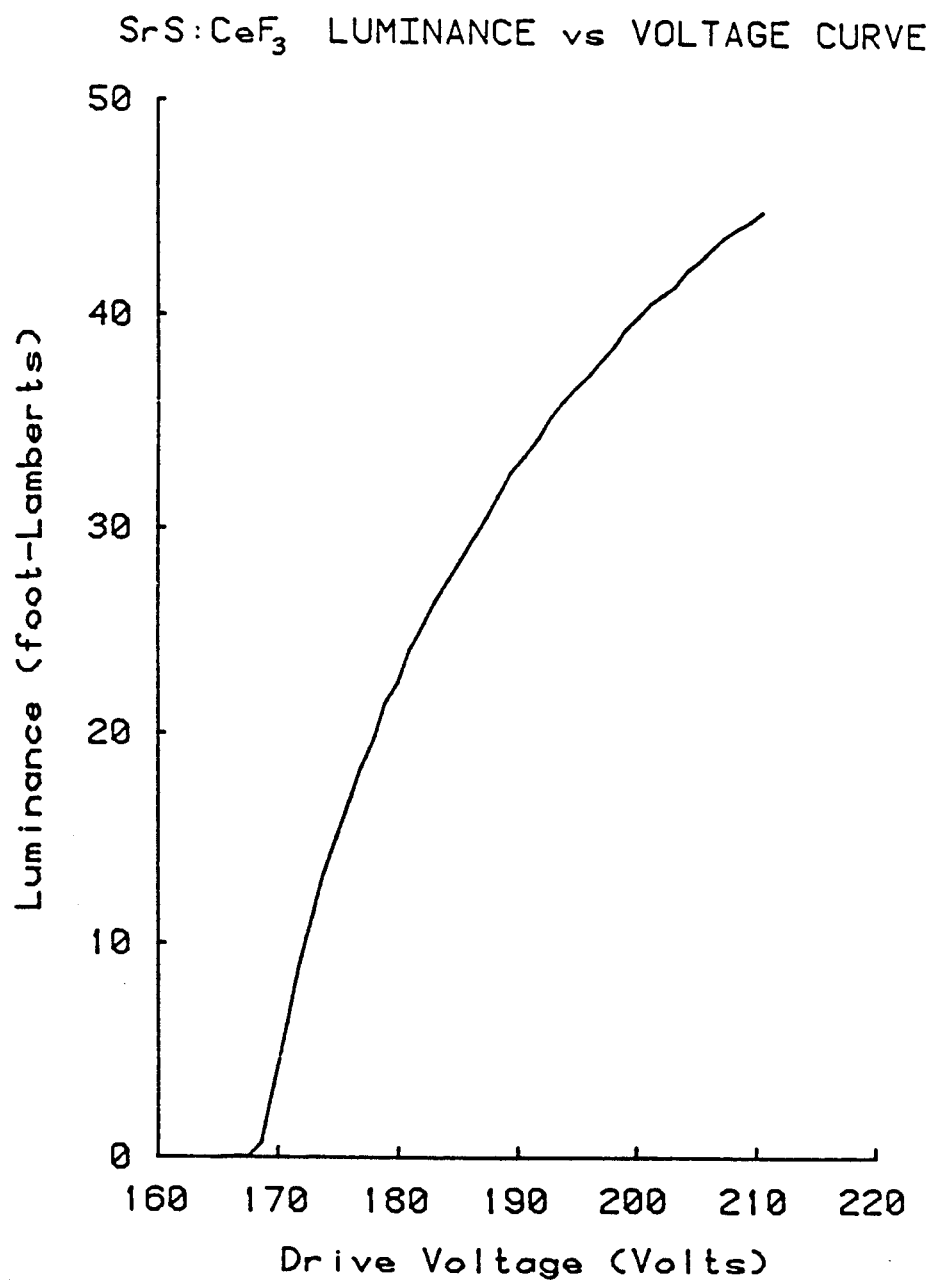
FIG. 3 is a luminance vs. applied voltage curve, at a drive frequency of 1 kHz, for an exemplary $SrS:CeF_3$ blue phosphor TFEL device of the type depicted in FIG. 2.
Figure 4:
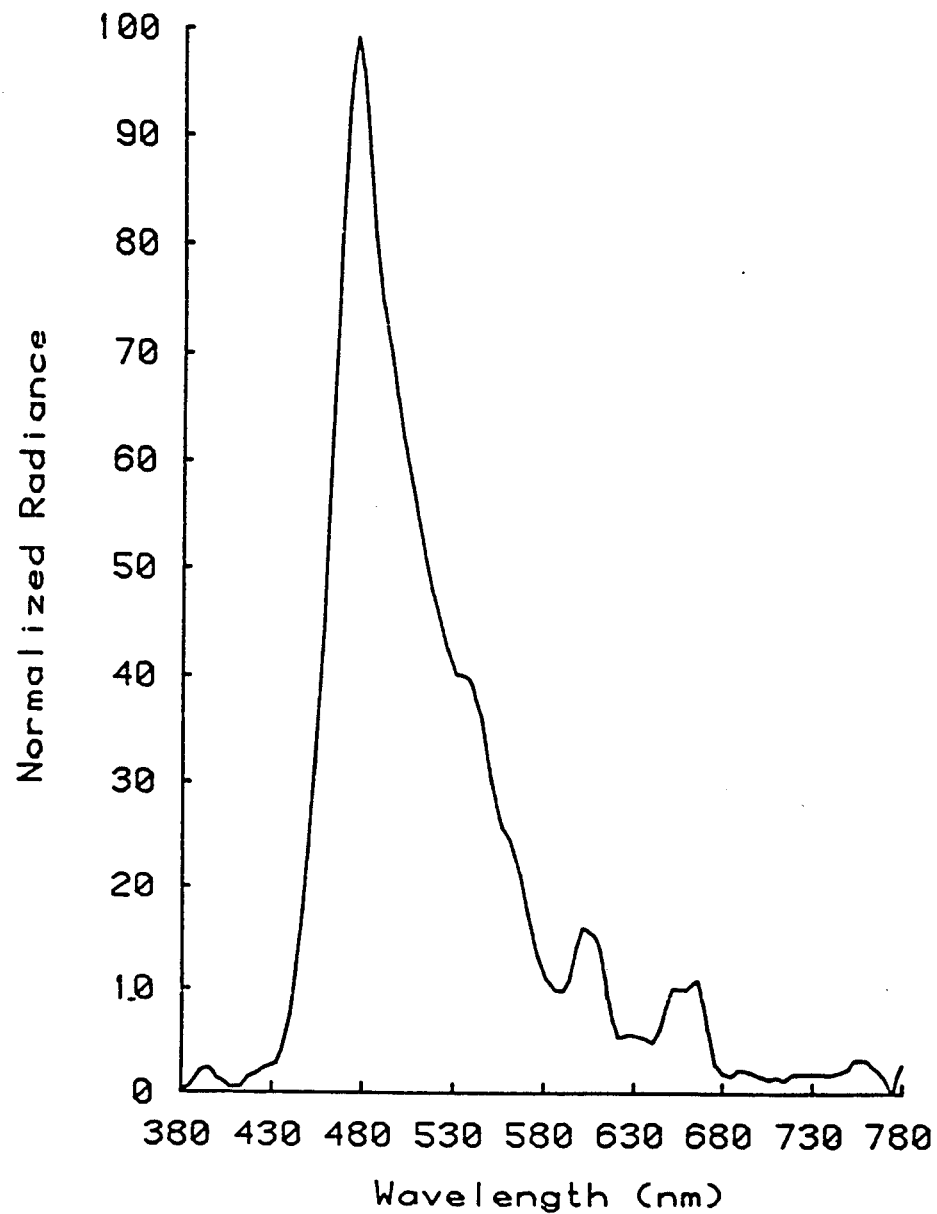
FIG. 4 is an emission spectrum plot of an exemplary $SrS:CeF_3$ blue phosphor TFEL device of the type depicted in FIG. 2.

FIGS. 3 and 4 depict performance characteristics of an exemplary SrS:CeF$_3$ blue phosphor TFEL device made in accordance with Example 2 and configured as in FIG. 2. At an applied drive frequency of 1 kHz, luminance increases with applied voltage, reaching 45 fL at 210 volts. The emission spectrum exhibits a fairly broad peak near 470 nanometers (nm).

Figure 5:
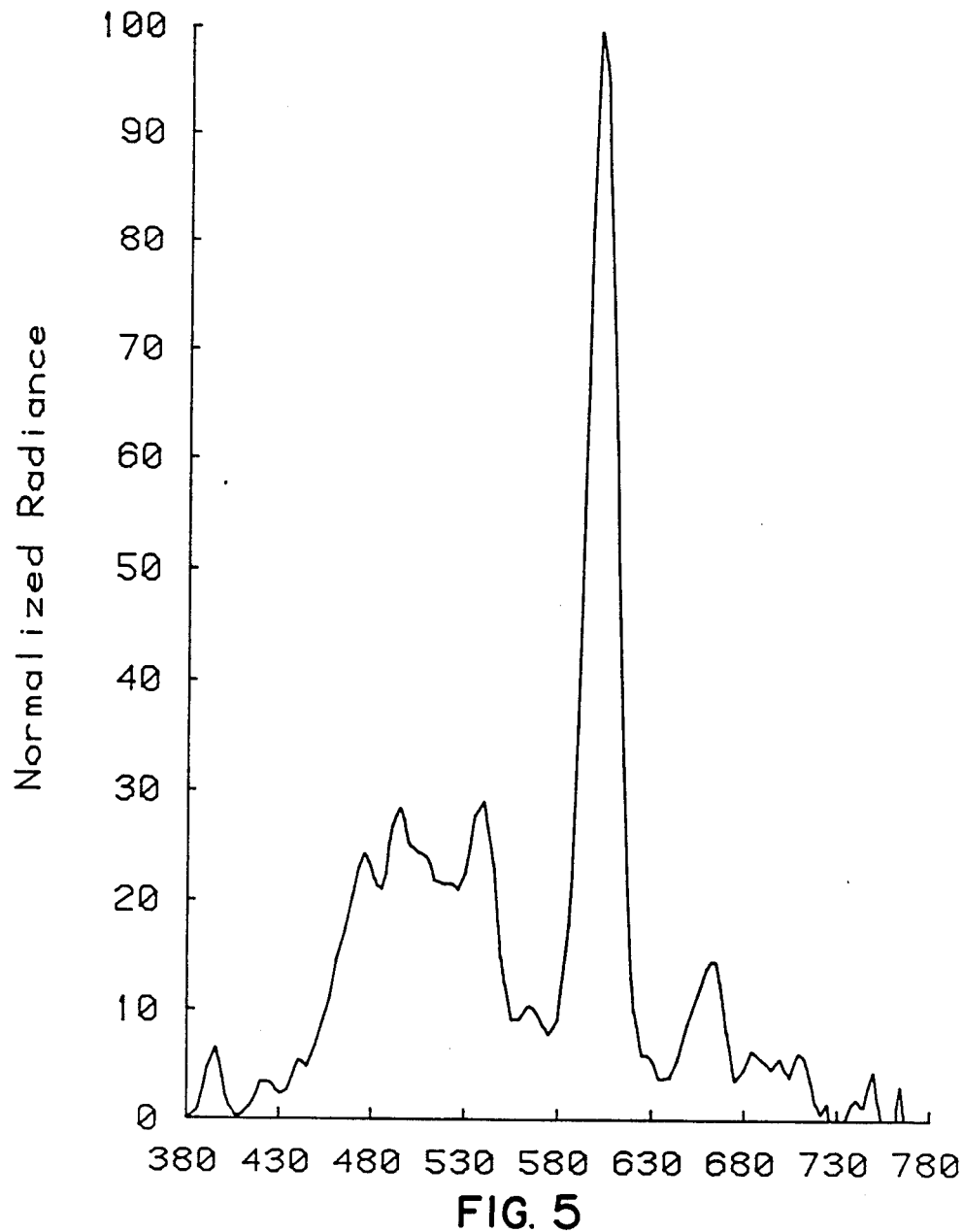
FIG. 5 is an emission spectrum plot of an exemplary $SrS:CeF_3$ blue phosphor TFEL device of the type depicted in FIG. 2 and having a significant impurity level, the plot, when compared with that of FIG. 4, illustrating the changes in the emission spectrum which occur as a result of such impurity level.
Figure 6:
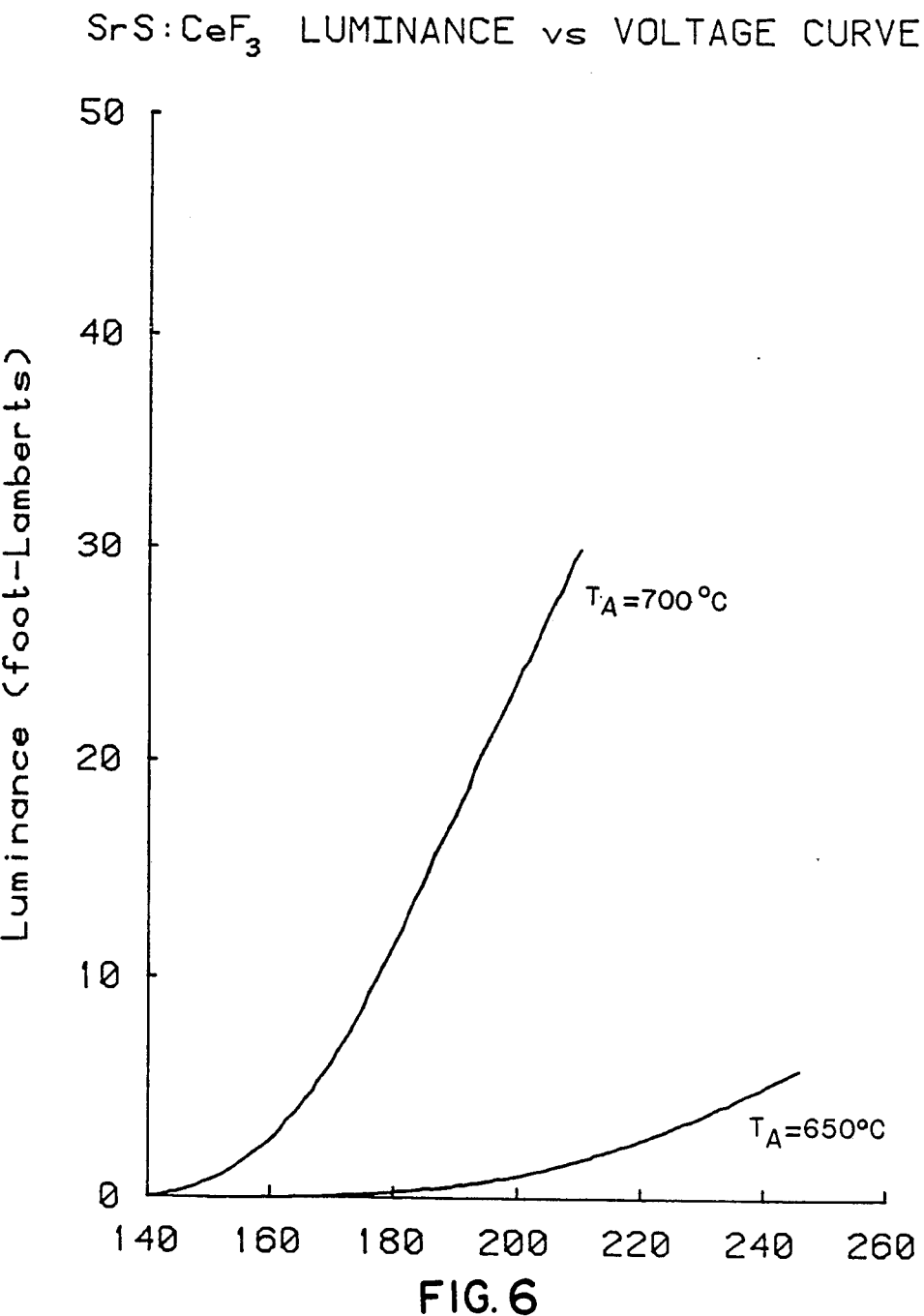
FIG. 6 is two curves of luminance vs. applied voltage for exemplary $SrS:CeF_3$ blue phosphor TFEL devices of the type depicted in FIG. 2 showing the effects of different levels of heat treatments on device performance characteristics.

As mentioned earlier, the performance of the TFEL device was found to be profoundly influenced by the amount of impurity present in the phosphor and the level of crystallization of the deposited film, as determined by the degree of heat treatment. FIGS. 5 and 6 illustrate these observed phenomena. In FIG. 5 the emission spectrum of an SrS:CeF$_3$ TFEL device is shown in which the phosphor film was intentionally deposited in a partial pressure of oxygen, rather than in vacuum. The spectrum of the resulting "contaminated" phosphor exhibits peaks near 500 nm, 600 nm and 660 nm, and the emission appears decidedly more green than blue. FIG. 6 shows the luminance vs. applied voltage curve, at 1 kHz drive frequency for exemplary SrS:CeF$_3$ TFEL devices, of the construction depicted in FIG. 2, annealed at two different temperatures. The specimen with the 700° C. anneal temperature exhibited luminance several times brighter than the one having the 650° C. anneal temperature. The higher anneal temperature produces more complete crystallization of the film grain structure, and this has been corroborated with transmission electron microscopy studies.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An AC-excited thin-film electroluminescent (TFEL) device comprised of:
    (a) a doped alkaline earth sulphide phosphor in a thin crystalline layer;
    (b) a pair of ZnS carrier injection layers sandwiching said phosphor layer for increasing the amount of visible light emitted from said phosphor layer, when the latter is excited by an AC source, by augmenting the supply of available carriers to said phosphor layer thereby lowering the threshold voltage of said AC-excited thin-film electroluminescent device and increasing the luminous efficiency thereof;
(c) a pair of insulating layers sandwiching said carrier injection layers and said phosphor layer;
(d) a pair of electrode layers sandwiching said insulating layers, said carrier injection layers and said phosphor layer; and
(e) a supporting substrate.

2. The TFEL device of claim 1 in which said phoshor layer is crystallized by annealing at a temperature above 600° C. and has a thickness about 5000 Å.

3. A TFEL device according to claim 1 wherein, upon suitable AC-excitation, said phosphor layer is an effective blue light emitter having a luminous efficiency greater than about 0.1 lumens per watt and a luminance greater than about 20 foot-lamberts.

4. A TFEL device according to claim 3 in which said phosphor consists essentially of strontium sulphide (SrS) doped with cerium fluoride ($CeF_3$).

5. An AC-excited thin-film electroluminescent (TFEL) device comprised of:

(a) a doped alkaline earth sulfide phosphor in a thin crystalline layer;
(b) a pair of ZnS layers sandwiching said phosphor layer being annealed together at a high temperature for promoting crystalline growth in said doped alkaline earth sulfide phosphor thereby increasing the amount of visible light emitted from said phosphor layer when said phosphor layer is excited by an AC source;
(c) a pair of insulating layers sandwiching said ZnS layers and said phosphor layer;
(d) a pair of electrode layers sandwiching said insulating layers, said ZnS layers and said phosphor layer; and
(e) a supporting substrate.

6. The TFEL device of claim 5 wherein said alkaline earth sulfide phosphor layer emits blue light when excited by said AC source.

7. The TFEL device of claim 5 in which said phosphor layer is crystallized by annealing at a temperature above 600° C. and has a thickness about 5000 Å.

* * * * *